US009742665B2

(12) United States Patent
Miyoshi (10) Patent No.: US 9,742,665 B2
(45) Date of Patent: Aug. 22, 2017

(54) COMMUNICATION NETWORK CONTROL SYSTEM, CONTROL METHOD THEREOF, AND NON-TRANSITORY COMPUTER READABLE MEDIUM OF CONTROL PROGRAM

(71) Applicant: NEC Corporation, Tokyo (JP)

(72) Inventor: Kazunori Miyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 127 days.

(21) Appl. No.: 14/655,689

(22) PCT Filed: Aug. 13, 2013

(86) PCT No.: PCT/JP2013/004853
§ 371 (c)(1),
(2) Date: Jun. 25, 2015

(87) PCT Pub. No.: WO2014/108944
PCT Pub. Date: Jul. 17, 2014

(65) Prior Publication Data
US 2015/0334007 A1 Nov. 19, 2015

(30) Foreign Application Priority Data
Jan. 8, 2013 (JP) .................................. 2013-001308

(51) Int. Cl.
*H04L 12/703* (2013.01)
*H04L 12/24* (2006.01)
(Continued)

(52) U.S. Cl.
CPC .......... *H04L 45/28* (2013.01); *H04L 41/0654* (2013.01); *H04L 45/12* (2013.01); *H04W 76/028* (2013.01)

(58) Field of Classification Search
None
See application file for complete search history.

(56) References Cited

U.S. PATENT DOCUMENTS

| 6,829,634 | B1 | 12/2004 | Holt et al. | |
|---|---|---|---|---|
| 2004/0148348 | A1 | 7/2004 | Holt et al. | |
| 2013/0094398 | A1* | 4/2013 | Das | H04W 12/00 370/254 |

FOREIGN PATENT DOCUMENTS

| EP | 1305908 | 5/2006 |
|---|---|---|
| JP | 09-284324 | 10/1997 |

(Continued)

OTHER PUBLICATIONS

International Search Report corresponding to PCT/JP2013/004853, mail date Nov. 19, 2013, 1 page.
(Continued)

*Primary Examiner* — Diane Lo
(74) *Attorney, Agent, or Firm* — Wilmer Cutler Pickering Hale and Dorr LLP (57) ABSTRACT

A communication network control system (1) eliminates, in a communication network (G) in which a plurality of nodes ($N_i$) are connected via a plurality of links (2), a node ($N_x$) having a trouble and implements a reconnection in the communication network (G). The nodes ($N_i$) each comprise: a path information calculation means (3) that calculates path information of the communication network (G) when a trouble occurs in an adjacent node ($N_x$); an order information calculation means (4) that calculates, for a set of reconnection destination candidate nodes ($N_i$), order information in which the reconnection destination candidate nodes are sequenced in order of inter-node distance on the path information calculated by the path information calculation means (3); and a determination information calculation means (5) that calculates, on the basis of the order information calculated by the order information calculation means (4), such a combination that the inter-node distance on the path information in the whole communication network (G) after the reconnection becomes larger and that (Continued)

determines the calculated combination as a reconnection destination node of the local node ($N_i$).

14 Claims, 9 Drawing Sheets

(51) Int. Cl.
*H04W 76/02* (2009.01)
*H04L 12/721* (2013.01)

(56) References Cited

FOREIGN PATENT DOCUMENTS

| JP | 2004-505550 | 2/2004 |
|----|-------------|--------|
| JP | 2007-014030 | 1/2007 |
| JP | 2013-070300 | 4/2013 |
| WO | WO-02/11366 | 2/2002 |

OTHER PUBLICATIONS

Alexander Lubotzky, R. Phillips and Peter Sarnak, "Ramanujan graphs" Combinatorica 8, 261-277, 1988.

\* cited by examiner

RANKING INFORMATION Li

| 2-hop DISTANT NODE | DISTANCE INFORMATION IN SHORTEST ROUTE INFORMATION |
|---|---|
| $N_j$ | 8 |
| $N_k$ | 7 |
| $N_l$ | 4 |

RANKING INFORMATION Li

| OWN NODE | 2-hop DISTANT NODE | DISTANCE INFORMATION IN SHORTEST ROUTE INFORMATION |
|---|---|---|
| $N_0$ | $N_{14}$ | 7 |
| $N_0$ | $N_{32}$ | 7 |
| $N_0$ | $N_{44}$ | 6 |
| $N_1$ | $N_{16}$ | 5 |
| ⋮ | ⋮ | ⋮ |
| $N_i$ | $N_j$ | 8 |
| $N_i$ | $N_k$ | 7 |
| $N_i$ | $N_l$ | 4 |
| ⋮ | ⋮ | ⋮ |

Fig. 9

COMMUNICATION NETWORK CONTROL SYSTEM, CONTROL METHOD THEREOF, AND NON-TRANSITORY COMPUTER READABLE MEDIUM OF CONTROL PROGRAM

CROSS-REFERENCE TO RELATED APPLICATIONS

This application is a national stage application of International Application No. PCT/JP2013/004853 entitled "COMMUNICATION NETWORK CONTROL SYSTEM, CONTROL METHOD THEREOF, AND NON-TRANSITORY COMPUTER READABLE MEDIUM OF CONTROL PROGRAM," filed on Aug. 13, 2013, which claims the benefit of the priority of Japanese Patent Application No. 2013-001308, filed on Jan. 8, 2013, the disclosures of each of which are hereby incorporated by reference in their entirety.

TECHNICAL FIELD

The present invention relates to a communication network control system, a control method and a control program thereof for controlling a communication network with a plurality of nodes mutually connected via links.

BACKGROUND ART

In the field of network topology, "merit as a graph when applied to a communication network," has been one of the research subjects in recent years, where, for example, the advantage of Ramanujan graphs has been demonstrated.

CITATION LIST

Patent Literature

PTL 1: Japanese Patent Application Laid-Open No. 2007-014030
PTL 2: Japanese Patent Application Laid-Open No. H09-284324

SUMMARY OF INVENTION

Technical Problem

For example, Ramanujan graphs have been applied to communication networks and power networks as physical/logical topologies. On the other hand, there has arisen a problem of whether it is possible or not to maintain the same degree of efficiency and robustness as those of an original graph even when a node or a link is eliminated from the original graph owing to a failure (breakdown or the like) in the node or link.

In this respect, already known is a communication network control system which reconfigures the communication network when a failure occurs in a node or the like (for example, PTL 1 and 2 are referred to). Further, as a method in which the problem is partially solved with respect to a Ramanujan graph mentioned above, the ZigZag method is known, for example. The ZigZag method is a method of constructing, from an original Ramanujan graph, a Ramanujan graph with a larger size than that of the original one, where it is possible to repeatedly construct a Ramanujan graph with a size being m times that of the original one (m: integer equal to or larger than 3).

The present invention has been conceived in order to solve the above-described problem, and accordingly, the main objective is to provide a communication network control system, a control method and a control program thereof which can optimally reconstruct the communication network while maintaining the characteristics of the original graph even when a failure occurs in a node or a link included in the communication network.

Solution to Problem

One aspect of the present invention for achieving the above-described objective is a communication network control system for, in the communication network with a plurality of nodes mutually connected via a plurality of links, eliminating any of the nodes having a failure and performing reconnection within the communication network, the communication network control system being characterized by that at least one of the plurality of nodes comprises: a route information calculation means for calculating route information in the communication network when a failure occurs in an adjacent node; a ranking information calculation means for calculating, with respect to a set of destination candidate nodes to which the reconnection may be made, ranking information in which the destination candidate nodes are ranked in order of their distances in the route information calculated by the route information calculation means; and a determination information calculation means for calculating, on the basis of the ranking information calculated by the ranking information calculation means, a combination which causes node-to-node distances in the route information to be large for the set of destination candidate nodes of the reconnection, over the entire communication network after the reconnection, and determining the calculated combination as a reconnection destination node of the own node.

Another aspect of the present invention for achieving the above-described objective may be a control method of a communication network control system for, in the communication network with a plurality of nodes mutually connected via a plurality of links, eliminating any of the nodes having a failure and performing reconnection within the communication network, wherein the control method is characterized by that it comprises: a step of calculating route information in the communication network when a failure occurs in an adjacent node; a step of calculating, with respect to destination candidate nodes to which the reconnection may be made, ranking information in which the destination candidate nodes are ranked in order of their distances in the calculated route information; and a step of calculating, on the basis of the calculated ranking information, a combination which causes node-to-node distances in the route information to be large over the entire communication network after the reconnection, and determining the calculated combination as a reconnection destination node of the own node.

Still another aspect of the present invention for achieving the above-described objective may be a control program of a communication network control system for, in the communication network with a plurality of nodes mutually connected via a plurality of links, eliminating any of the nodes having a failure and performing reconnection within the communication network, wherein the control program is characterized by that it causes a computer to execute: a process of calculating route information in the communication network when a failure occurs in an adjacent node; a process of calculating, with respect to destination candidate nodes to which the reconnection may be made, ranking information in which the destination candidate nodes are ranked in order of their distances in the calculated route information; and a process of calculating, on the basis of the calculated ranking information, a combination which causes node-to-node distances in the route information to be large over the entire communication network after the reconnection, and determining the calculated combination as a reconnection destination node of the own node.

Advantageous Effects of Invention

According to the present invention, it is possible to provide a communication network control system, a control method and a control program thereof which can optimally reconstruct the communication network while maintaining the characteristics of the original graph even when a failure occurs in a node or a link included in the communication network.

DESCRIPTION OF EMBODIMENTS

Figure 1:
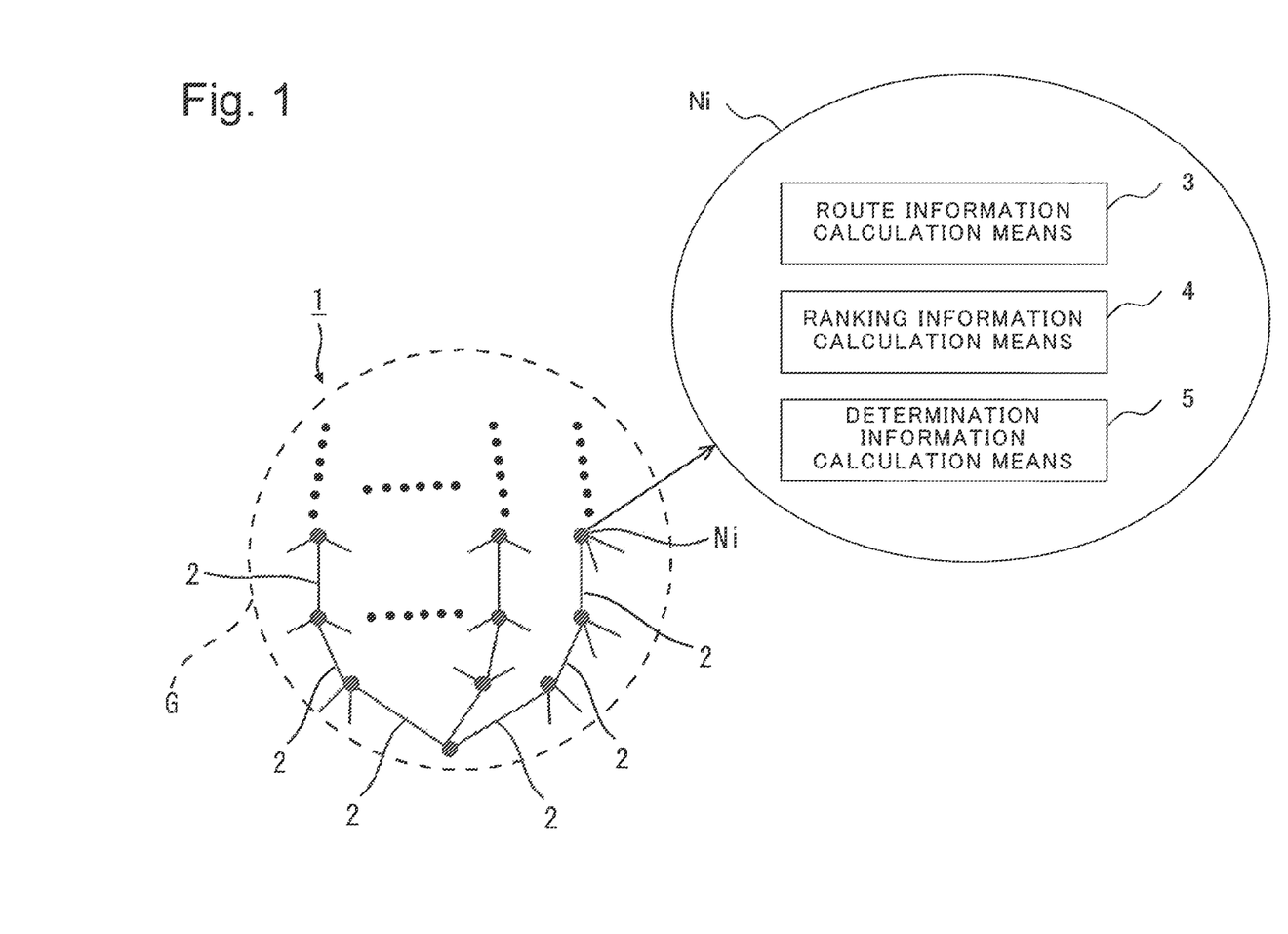
FIG. 1 is a functional block diagram of a communication network control system according to an exemplary embodiment of the present invention.

Hereinafter, exemplary embodiments of the present invention will be described with reference to drawings. FIG. 1 is a functional block diagram of a communication network control system according to an exemplary embodiment of the present invention.

The communication network control system 1 of the present exemplary embodiment for a communication network G with a plurality of nodes $N_i$ (i=0 to n−1) mutually connected via a plurality of links 2, eliminates any of the nodes $N_i$, having a failure and performs reconnection within the communication network G. At least one node $N_j$, among the plurality of nodes $N_i$ in the communication network control system 1 comprises a route information calculation means 3 which calculates route information in the communication network G, a ranking information calculation means 4 which calculates ranking information with respect to destination candidate nodes $N_i$ to which reconnection may be made, and a determination information calculation means 5 which determines a reconnection destination node $N_i$ of the own node $N_i$. The route information calculation means 3 calculates route information in the communication network G when a failure occurs in an adjacent node $N_j$. The ranking information calculation means 4 calculates, with respect to a set consisting of candidate nodes for a reconnection destination, ranking information in which the candidate nodes are ranked in order of their distances in the route information calculated by the route information calculation means 3. On the basis of the ranking information calculated by the ranking information calculation means 4, the determination information calculation means 5 calculates a combination which causes node-to-node distances in the route information to be large over the entire communication network G after reconnection, and on the basis of the calculated combination, determines a candidate node $N_j$ (here, j≠i and j=0 to n−1) for a reconnection destination of the own node $N_i$. By that way, it is possible to optimally reconstruct the communication network G while maintaining the characteristics of the original graph even when a failure occurs in a node or a link in the communication network G.

Exemplary Embodiment 1

Figure 2:
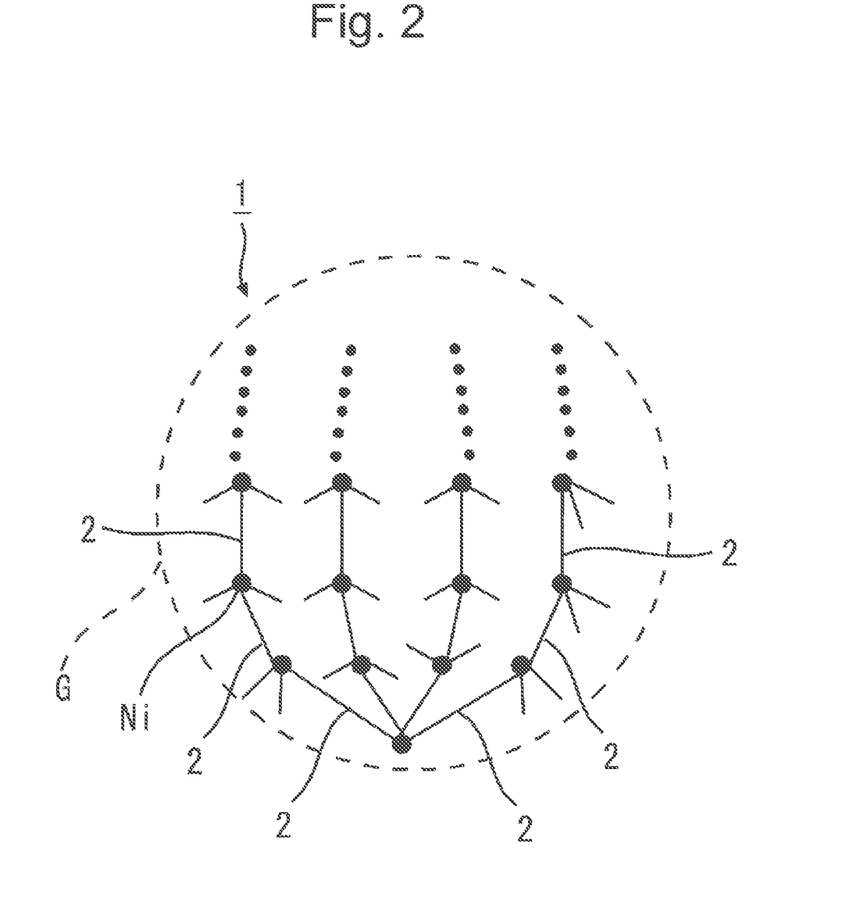
FIG. 2 is a diagram showing an example of a communication network according to an exemplary embodiment 1 of the present invention.

FIG. 2 is a diagram showing an example of a communication network according to an exemplary embodiment 1 of the present invention. As shown in FIG. 2, in the communication network G according to the present exemplary embodiment 1, a plurality of nodes $N_i$ are mutually connected via links 2. Here, for example, the nodes $N_i$ are routers, and the links 2 are each an optical fiber or a coaxial cable, which are media for communication. Besides, for example, the communication network G is constituted by n-number of nodes $N_i$ (i=0 to n−1).

Here, in the present exemplary embodiment 1, for example, a Ramanujan graph is adopted as a physical/logical topology of the communication network G. The Ramanujan graph belongs to graphs of the class called Expander, as a graph satisfying the following demands: (1) time for communication between any two nodes $N_i$ and $N_j$ is short, (2) a plurality of routes exist between any two nodes $N_i$ and $N_j$ (3) the number of links among nodes $N_i$ increases with increase in the communication network size (=the number of nodes) in only a linear or smaller order relationship. Although the nodal degree of the Ramanujan graph is, for example, a natural number multiple of 4 in the present exemplary embodiment 1, it does not need to be limited to that value, but may be any value.

Further, a definition of the Ramanujan graph will be further described in detail below. Assuming the communication network G to be a k-regular graph with n-number of nodes, and then lining up eigenvalues of the adjacency matrix A of the communication network G in descending order, the following expression (1-1) stands (refer to, for example, Alexander Lubotzky, R. Phillips and Peter Sarnak, "Ramanujan graphs" Combinatorica 8, 261-277, 1988).

[math 1]

$$k=\lambda_1(A(G))\geq\lambda_2(A(G))\geq \ldots \geq\lambda_{n-1}(A(G))\geq-k \quad \text{equation (1-1)}$$

Among the non-trivial eigenvalues other than $\lambda_1$, one having the largest absolute value is expressed as $\lambda(G)$.

[math 2]

$$\lambda(A(G)) = \max_{|\lambda_i|<k} |\lambda_i| \qquad \text{equation (1-2)}$$

In that case, a graph having an eigenvalue satisfying an inequality (1-3) is referred to as a Ramanujan graph.

[math 3]

$$\lambda(A(G)) \leq 2\sqrt{k-1} \qquad \text{inequality (1-3)}$$

Next, characteristics of the Ramanujan graph will be described.

A first characteristic is its being a k-regular graph. That is, the degree of every node $N_i$ is k. A second characteristic is that its expansion constant is large. The expansion constant is defined by a following expression (1-4). Here, $\lambda_2$ (L(G)) is the second smallest eigenvalue of the Laplacian matrix of the graph G.

[math 4]

$$c^* \geq \frac{1}{2}\left(1 - \frac{\lambda_{n-1}(A(G))}{k}\right) = \frac{\lambda_2(L(G))}{2k} \qquad \text{inequality (1-4)}$$

A third characteristic is that its internal circumference is long. Here, the internal circumference is referred to as the length of the shortest one of loops not passing the same link twice in the graph (closed routes) (refer to, for example, Toyokazu Hiramatsu and Hiroshi Chinen, "Introduction to finite mathematics—finite upper half plane and Ramanujan graph", Makino Shoten, 2003, ISBN4-434-03407-3). A fourth characteristic is that its diameter is short. Here, the diameter is referred to as the longest one of shortest distances each being that between any two points in the graph.

According to the communication network control system 1 in the present exemplary embodiment 1, it becomes possible, when one of the nodes $N_i$ has been eliminated, to maintain the Ramanujan graph described above or a graph based on the Ramanujan graph by only reconnecting a link 2 having been connected to the eliminated node $N_i$ to another node $N_j$. That is, it is possible to maintain the advantageous characteristics of the Ramanujan graph, which are a short communication time between any two nodes $N_i$, existence of a plurality of routes between any two nodes $N_i$, and increase of the number of links between the nodes $N_i$ in only a linear or smaller order relationship with increase in the communication network size.

In the communication network control system 1 according to the present exemplary embodiment 1, even when a node or a link in the communication network G is eliminated from such an original Ramanujan graph owing to a failure in the node or link, the same degree of efficiency and robustness as those of the original Ramanujan graph can be maintained.

In other words, by only eliminating a node $N_i$ in which a failure has occurred (a breakdown node) from a Ramanujan graph with a size of n and changing the connection of a link 2 having been connected to the node $N_i$ in which a failure has occurred, it is possible to reconfigure a Ramanujan graph with a size of (n-1) having approximately the same characteristics as those of the Ramanujan graph with a size of n.

Next, a configuration of the communication network system according to the present exemplary embodiment 1 will be described in detail. In the communication network control system 1 according to the present exemplary embodiment 1, when any node $N_i$ in which a failure has occurred has been eliminated in the communication network G, each of the remaining nodes $N_i$ performs reconnection in an autonomous and distributed manner. Here, a description will be given of a case where the node degree k is 4.

Figure 3:
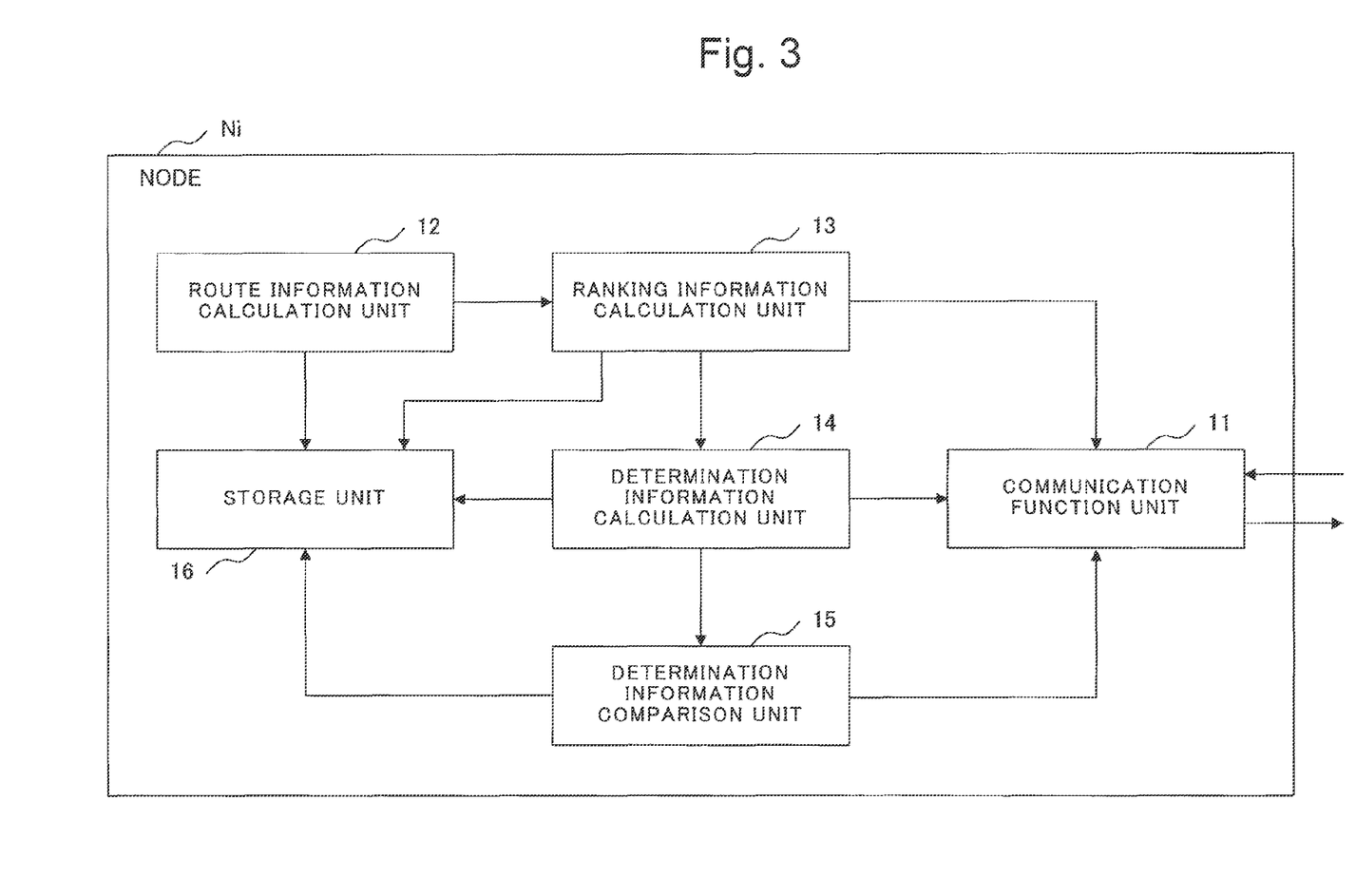
FIG. 3 is a block diagram showing a schematic system configuration of each node in a communication network control system according to the exemplary embodiment 1 of the present invention.

FIG. 3 is a block diagram showing a schematic system configuration of each node in the communication network control system according to the present exemplary embodiment 1.

Each node $N_i$ in the communication network control system 1 comprises a communication function unit 11, a route information calculation unit 12, a ranking information calculation unit 13, a determination information calculation unit 14, a determination information comparison unit 15 and a storage unit 16.

Here, for example, each node $N_i$ is constituted by hardware which mainly consists of a microcomputer composed of a CPU (Central Processing Unit) performing a control process, a computation process and the like, a ROM (Read Only Memory) storing a control program, a computation program and the like to be performed by the CPU, a RAM (Random Access Memory) transitorily storing processing data or the like, and the like. The CPU, ROM and RAM are mutually connected via a data bus or the like.

The communication function unit 11 of each node $N_i$ has a function as a communication interface for exchanging communication information with other nodes $N_i$.

The route information calculation unit 12 of each node $N_i$ is a specific example of the route information calculation means, and it accordingly calculates shortest route information $M_i$ (i=0 to n-1) on the shortest routes to respective ones of all nodes $N_i$ located at a 2 hop distance from the own node, on the basis of a route control protocol or the like, at a time when a route control has been completed in the communication network G.

Further, when a node $N_x$ directly connected to the own node (hereafter, referred to as an adjacent node), among all nodes $N_i$ in the communication network G, breaks down, the route information calculation unit 12 of each node $N_i$ calculates shortest route information $M_i$ in which the own node is set as the starting point. The route information calculation unit 12 stores the calculated route information $M_i$ into the storage unit 16.

The ranking information calculation unit 13 of each node $N_i$ is a specific example of the ranking information calculation means, and it accordingly calculates ranking information Li (i=0 to n-1) in which destination candidate nodes $N_i$ to which reconnection may be made are ranked in descending order of their node-to-node distances in the shortest route information $M_i$ calculated by the route information calculation unit 12.

Figure 4:
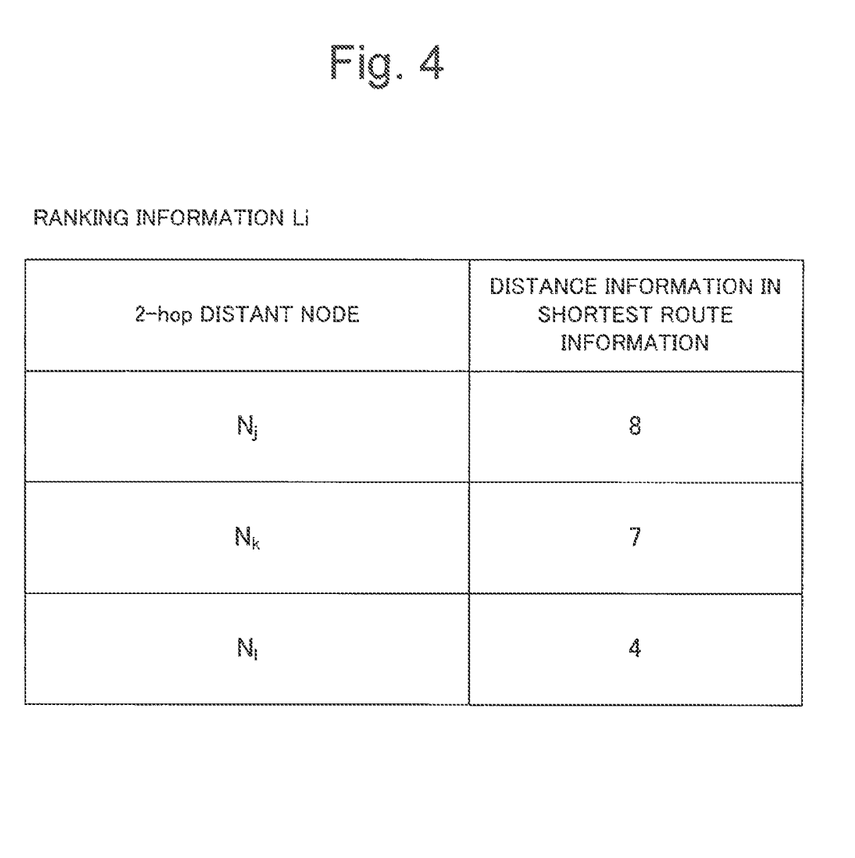
FIG. 4 is a diagram showing an example of ranking information and distance information in shortest route information.

The ranking information calculation unit 13 of each node $N_i$ calculates the ranking information Li in which destination candidate nodes $N_j$, $N_k$ and $N_l$ ($j \neq k \neq l \neq i \neq x$ and j, k, l=0 to n-1) to which reconnection (of the link 2 having been connected to the adjacent node $N_x$ having broken down) may be made are ranked in descending order of their node-to-node distances in the shortest route information $M_i$. The ranking information calculation unit 13 stores the calculated ranking information Li into the storage unit 16, along with the distance information in the shortest route information $M_i$ (FIG. 4).

When there is an adjacent node $N_x$ having broken down, the ranking information calculation unit 13 of each node $N_i$ exchanges the calculated ranking information Li with all of the destination candidate nodes $N_j$, $N_k$ and $N_l$, via the communication function unit 11.

The determination information calculation unit 14 of each node $N_i$ is a specific example of the determination information calculation means, and it accordingly determines a reconnection destination of the own node $N_i$ on the basis of the ranking information Li calculated by the ranking information calculation unit 13. On the basis of the ranking information Li calculated by the ranking information calculation unit 13, the determination information calculation unit 14 of each node $N_i$ calculates a combination which makes largest the average of node-to-node distances in the shortest route information $M_i$ over the entire communication network G after reconnection. Then, the determination information calculation unit 14 determines the calculated combination of connections as a reconnection destination node of the own node $N_i$ and stores the determination information Di (i=0 to n−1) into the storage unit 16.

The determination information calculation unit 14 of each node $N_i$ sends the determination information Di having been determined, via the communication function unit 11, to the destination candidate nodes $N_j$, $N_k$ and $N_l$ to which reconnection may be made.

The determination information comparison unit 15 of each node $N_i$ is a specific example of the determination information comparison means, and if it receives determination information Di from the reconnection destination node $N_k$ via the communication function unit 11 and does not receive determination information Di from the other nodes $N_j$ and $N_l$ in the shortest route information $M_i$ calculated by the route information calculation unit 12, it fixes the determined reconnection destination node $N_k$ as the reconnection destination. The determination information comparison unit 15 of each node $N_i$ stores the fixed reconnection destination node $N_k$ into the storage unit 16, as fixed information Fi (i=0 to n−1).

When the node $N_x$ becomes unable to communicate owing to its breakdown or failure, the determination information comparison unit 15 of each node $N_i$ re-sets a node $N_j$ located at the next hop as the reconnection destination node $N_i$ in the fixed information Fi, and thereby performs route control of the communication network G.

The storage unit 16 of each node $N_i$ is a specific example of the storage means, and it is constituted by, for example, the above-described ROM or RAM.

Figure 5:
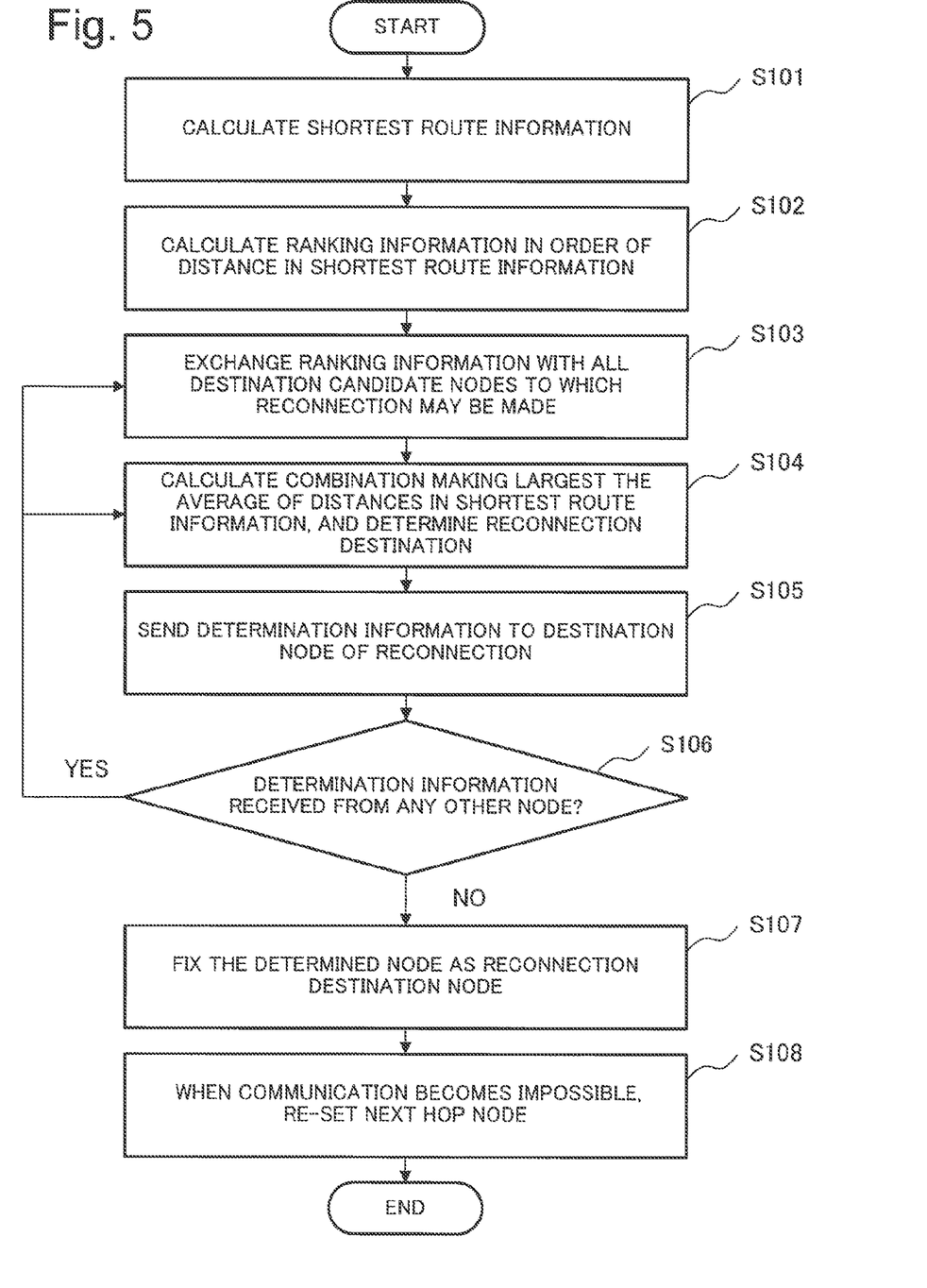
FIG. 5 is a flow chart showing a flow of a communication network control method according to the exemplary embodiment 1 of the present invention.

FIG. 5 is a flow chart showing a flow of a communication network control method according to the present exemplary embodiment 1.

At a time when route control has been completed in the communication network G, the route information calculation unit 12 of each node $N_i$ calculates shortest route information $M_i$ on the shortest routes to respective ones of all nodes $N_j$, $N_k$ and $N_l$ located at a 2 hop distance from the own node $N_i$ on the basis of a route control protocol or the like. Further, when a node directly connected to the own node $N_i$ among all nodes $N_i$ in the communication network G, has broken down, the route information calculation unit 12 calculates shortest route information $M_i$ in which the own node $N_i$ is set as the starting point, and stores the calculated shortest route information $M_i$ into the storage unit 16 (step S101).

The ranking information calculation unit 13 of each node $N_i$ calculates ranking information Li in which destination candidate nodes $N_j$, $N_k$ and $N_l$ to which reconnection may be made are ranked in descending order of their distances in the shortest route information $M_i$ calculated by the route information calculation unit 12 (step S102).

When there is an adjacent node $N_i$ having broken down, the ranking information calculation unit 13 of each node $N_i$ exchanges the calculated ranking information Li with all of the destination candidate nodes $N_j$, $N_k$ and $N_l$, via the communication function unit 11 (step S103).

On the basis of the ranking information Li calculated by the ranking information calculation unit 13, the determination information calculation unit 14 of each node $N_i$ calculates a combination which makes largest the average of node-to-node distances in the shortest route information $M_i$ over the entire communication network G after reconnection. The determination information calculation unit 14 determines the calculated combination of reconnections as a reconnection destination node of the own node $N_i$, and stores determination information Di according to the determination (i=0 to n−1) into the storage unit 16 (step S104).

The determination information calculation unit 14 of each node $N_i$ sends the determination information Di having been determined, via the communication function unit 11, to the destination candidate nodes to which reconnection may be made (step S105).

If the determination information comparison unit 15 of each node $N_i$ receives determination information Di from the reconnection destination node $N_k$ via the communication function unit 11 and does not receive determination information Di from the other nodes $N_j$ and $N_l$ in the shortest route information $M_i$ (NO at the step S106), it fixes the determined reconnection destination node $N_k$ as the reconnection destination (step S107). The determination information comparison unit 15 stores fixed information Fi indicating the fixed reconnection destination node $N_k$ into the storage unit 16.

On the other hand, if, on the other hand, the determination information comparison unit 15 of each node $N_i$ receives determination information Di from the reconnection destination nodes $N_j$ or $N_l$ via the communication function unit 11 (YES at the step S106), the process returns back to the above-described steps S103 or S104.

When its adjacent node $N_x$ becomes unable to communicate owing to its failure or the like, the determination information comparison unit 15 of each node $N_i$ re-sets a node $N_k$ located at the next hop as the reconnection destination node based on the fixed information Fi, and thereby performs route control of the communication network G.

As has been described above, according to the communication network control system 1 according to the present exemplary embodiment 1, by only eliminating a failure node $N_x$ from a Ramanujan graph with a size of n and changing the connection of a link 2 having been connected to the failure node $N_x$, it is possible to reconfigure a Ramanujan graph with a size of (n−1) having approximately the same characteristics as those of the Ramanujan graph with a size of n. That is, even when a failure has occurred in a node or a link in the communication network G, it is possible to optimally reconstruct the communication network G while maintaining the characteristics of the original graph.

Exemplary Embodiment 2

Figure 6:
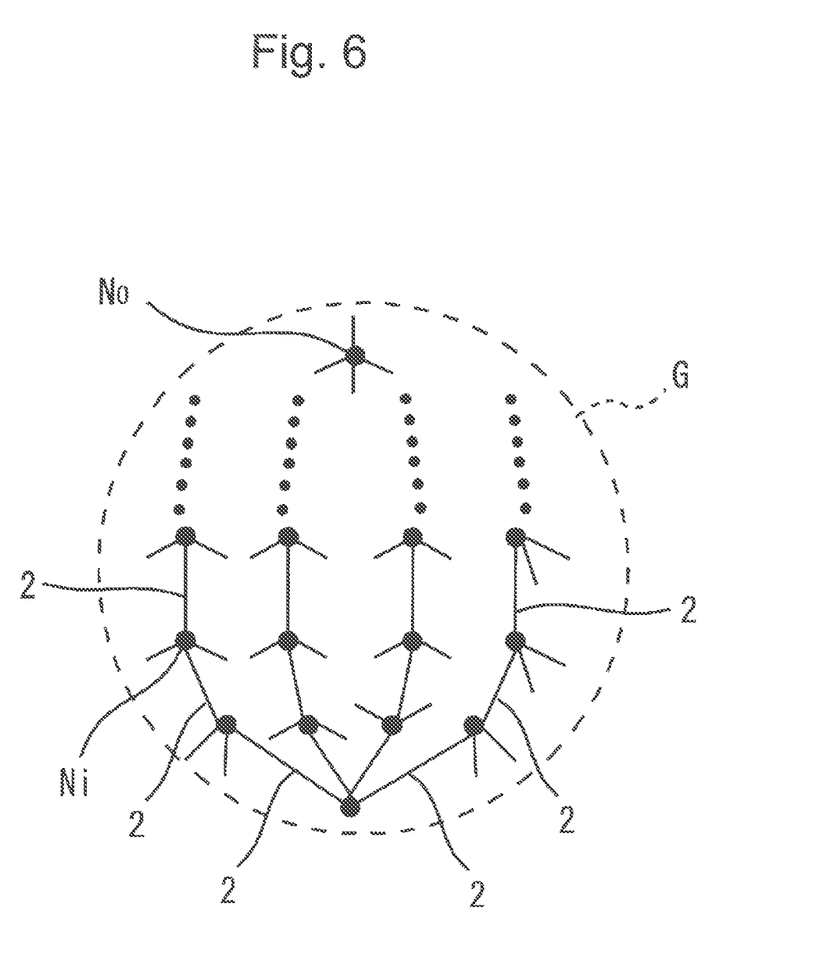
FIG. 6 is a diagram showing an example of a communication network according to an exemplary embodiment 2 of the present invention.

In contrast to that each node $N_i$ performs reconnection in an autonomous and distributed manner in the exemplary embodiment 1 just described above, an exemplary embodiment 2 described below is characterized by that a representative node $N_0$ performs reconnection in a centralized control manner. FIG. 6 is a diagram showing an example of a communication network according to the exemplary embodiment 2 of the present invention. In the communication network G, a representative node $N_0$ to work as the central node is assigned in advance, to which a plurality of nodes $N_i$ are connected via links 2.

Figure 7:
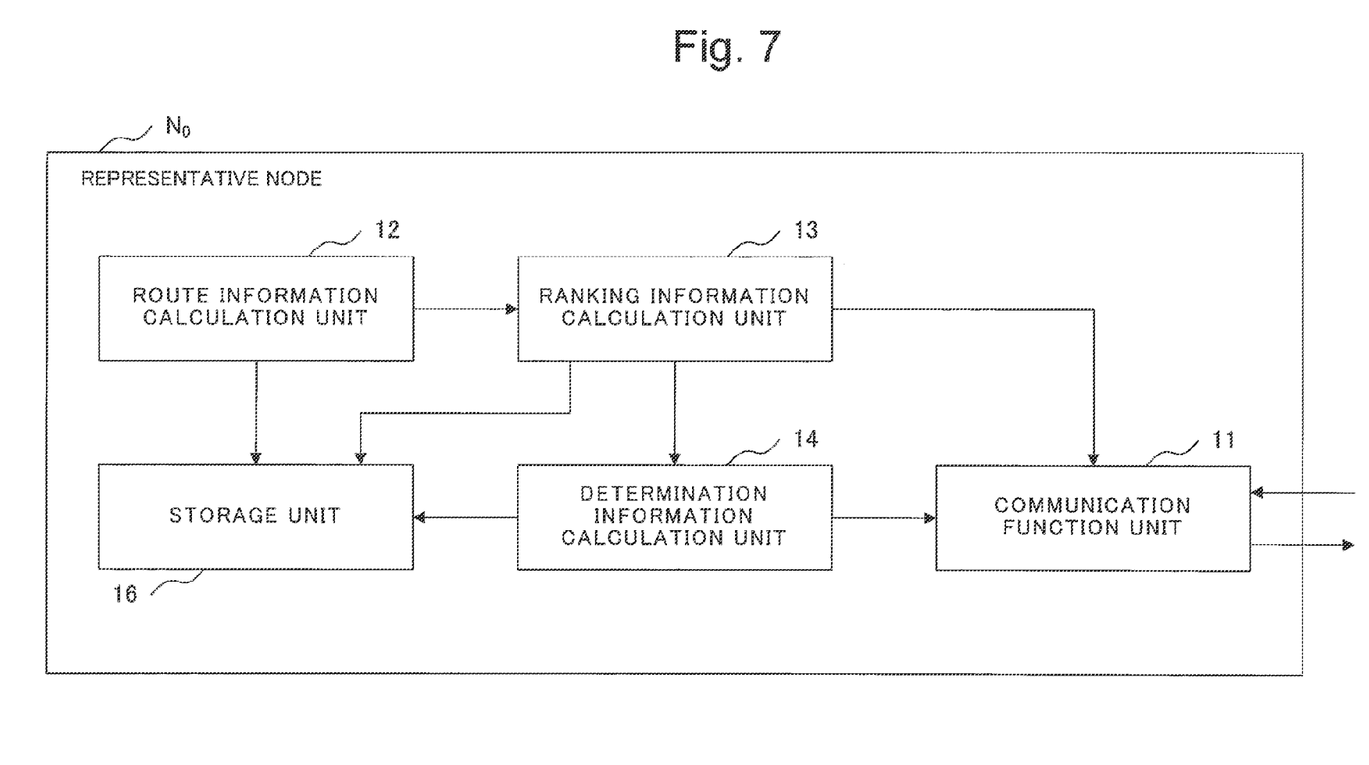
FIG. 7 is a block diagram showing a schematic system configuration of a representative node in a communication network control system according to the exemplary embodiment 2 of the present invention.

FIG. 7 is a block diagram showing a schematic system configuration of a representative node in a communication network control system according to the present exemplary embodiment 2. The representative node $N_0$ in the communication network control system 1 comprises a communication function unit 11, a route information calculation unit 12, a ranking information calculation unit 13, a determination information calculation unit 14 and a storage unit 16.

At a time when route control has been completed in the communication network G, the route information calculation unit 12 of the representative node $N_0$ calculates, with respect to each and every node $N_i$ in the communication network G, shortest route information $M_i$ (i=0 to n−1) on shortest routes to nodes located at a 2 hop distance from the own node, on the basis of a route control protocol or the like. The route information calculation unit 12 of the representative node $N_0$ further calculates, with respect to each node set including a node $N_i$ having broken down in the communication network G, shortest route information $M_i$ in which the node $N_i$ included in the node set is set as the starting point. The route information calculation unit 12 stores the calculated shortest route information $M_i$ into the storage unit 16.

Figure 8:
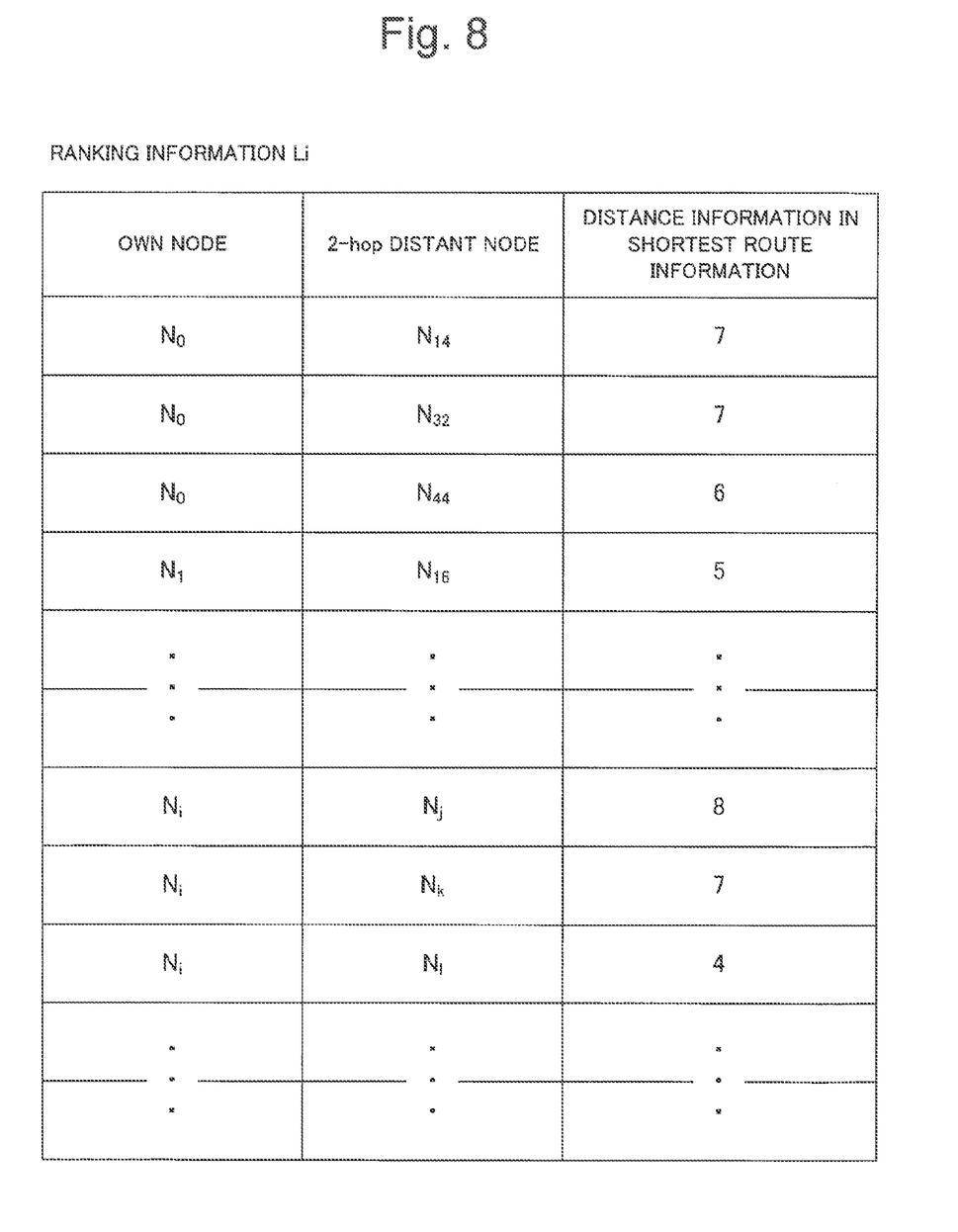
FIG. 8 is a diagram showing an example of ranking information and distance information in shortest route information.

The ranking information calculation unit 13 of the representative node $N_0$ calculates ranking information Li (i=0 to n−1) based on the shortest route information $M_i$ with respect to destination candidate nodes $N_i$ to which reconnection may be made. More specifically, when a node $N_x$ in the communication network G has broken down, the ranking information calculation unit 13 of the representative node $N_0$ calculates, with respect to destination candidate nodes $N_j$, $N_k$ and $N_l$ to which reconnection of a link 2 having been connected to the failure node $N_x$ and to a node $N_i$ adjacent to the failure node $N_x$ may be made, the ranking information Li in which the candidate nodes are ranked in descending order of their distances in the shortest route information $M_i$ calculated by the route information calculation unit 12. Then, the ranking information calculation unit 13 stores the calculated ranking information Li into the storage unit 16, along with the distance information in the shortest route information $M_i$ (FIG. 8).

On the basis of the ranking information Li calculated by the ranking information calculation unit 13, the determination information calculation unit 14 of the representative node $N_0$ determines a reconnection destination of each node $N_i$. For example, on the basis of the ranking information Li calculated by the ranking information calculation unit 13, the determination information calculation unit 14 calculates a combination of connections which makes largest the average of distances in the shortest route information $M_i$ over the entire communication network G after reconnection. Then, the determination information calculation unit 14 determines the calculated combination of connections as a reconnection destination node of each node $N_i$ and stores fixed information Fi (i=0 to n−1) representing the determination results into the storage unit 16.

When the node $N_x$ has become unable to communicate owing to its breakdown or failure in the actual communication network G, the determination information calculation unit 14 of the representative node $N_0$ performs re-route control, on the basis of the fixed information Fi.

Figure 9:
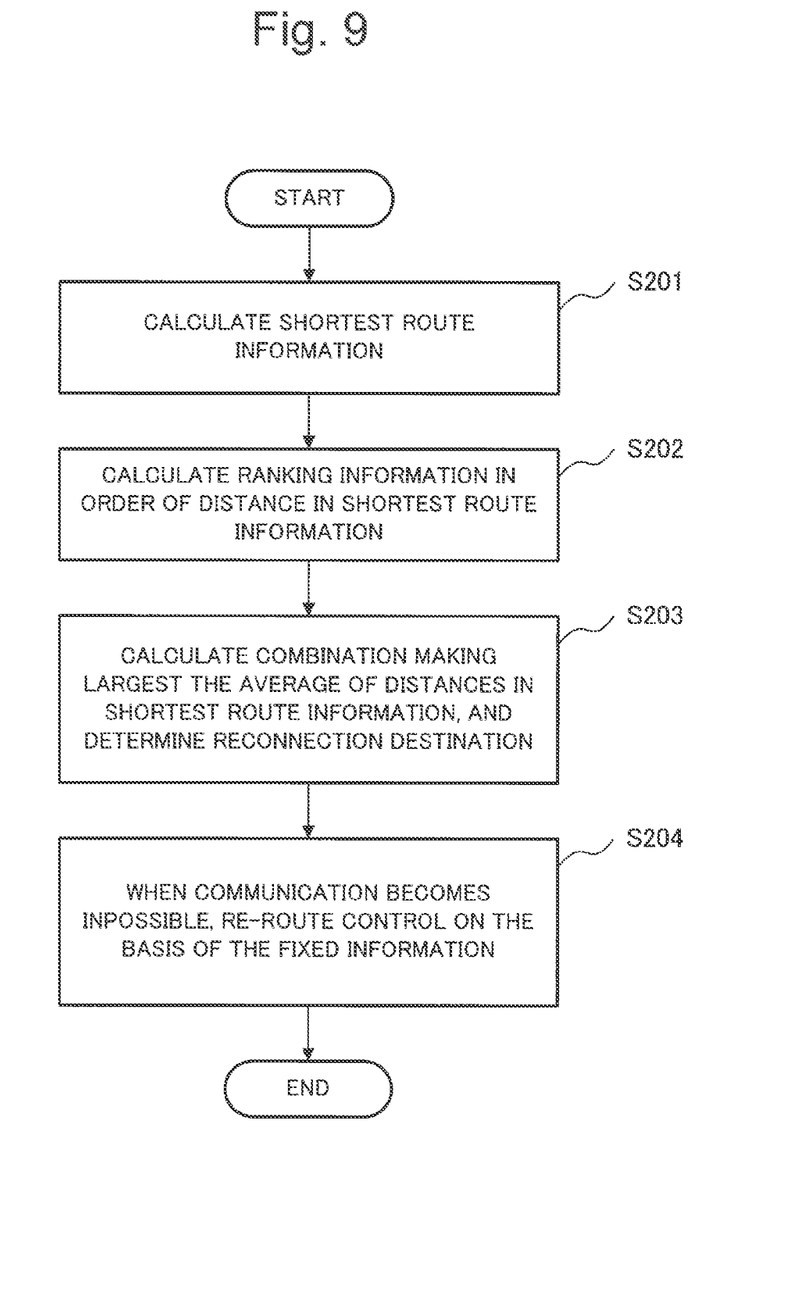
FIG. 9 is a flow chart showing a flow of a communication network control method according to the exemplary embodiment 2 of the present invention.

FIG. 9 is a flow chart showing a flow of a communication network control method according to the present exemplary embodiment 2.

At a time when route control has been completed in the communication network G, the route information calculation unit 12 of the representative node $N_0$ calculates shortest route information $M_i$ (i=0 to n−1) with respect to each and every node $N_i$ in the communication network G, on the basis of a route control protocol or the like. Further, when a node $N_x$ in the communication network G has broken down, the route information calculation unit 12 of the representative node $N_0$ calculates, with respect to a set of adjacent nodes of the node $N_x$ having broken down, shortest route information $M_i$ in which each of the nodes $N_i$ included in the set is set as the starting point, and stores the calculated shortest route information $M_i$ into the storage unit 16 (step S201).

The ranking information calculation unit 13 of the representative node $N_0$ calculates, with respect to destination candidate nodes $N_j$, $N_k$ and $N_l$ to which reconnection of a link 2 having been connected to the node $N_x$ having broken down may be made, ranking information Li in which the destination candidate nodes are ranked in descending order of their distances in the shortest route information $M_i$ calculated by the route information calculation unit 12. Then, the ranking information calculation unit 13 stores the calculated ranking information Li into the storage unit 16, along with the distance information in the shortest route information $M_i$ (step S202).

Here, for example, when the communication network G is large in size and is configured hierarchically, there should be a limit to a manageable range of the representative node $N_0$, and accordingly, there may be a case where nodes $N_i$ in a lower class cannot be managed. In that case, the present method may be configured such that a node in the lower class $N_i$ sends ranking information Li to the representative node $N_0$ when a failure has occurred in the lower class node $N_i$. The representative node $N_0$ sends fixed information Fi, which will be described below, to the lower class node $N_i$. By that way, the communication network G can be optimally reconstructed even when it is large in size.

On the basis of the ranking information Li calculated by the ranking information calculation unit 13, the determination information calculation unit 14 of the representative node $N_0$ calculates a combination of connections which makes largest the average of node-to-node distances in the shortest route information $M_i$ over the entire communication network G after reconnection. Then, the determination information calculation unit 14 determines the calculated combination of connections as a reconnection destination node of each node $N_i$, and stores fixed information Fi (i=0 to n−1) representing the determination results into the storage unit 16 (step S203).

When a node $N_i$ has become unable to communicate owing to its breakdown or failure in the actual communication network G, the determination information calculation unit 14 of the representative node $N_0$ performs re-route control, on the basis of the fixed information Fi (step S204).

As has been described above, in the communication network control system 1 according to the present exemplary embodiment 2, by only eliminating a node $N_x$ in which a breakdown or a failure has occurred, from a Ramanujan graph with a size of n, and changing the connection of a link 2 having been connected to the node $N_x$ in which a breakdown or a failure has occurred, it is possible to reconfigure a Ramanujan graph with a size of (n−1) having approximately the same characteristics as those of the Ramanujan graph with a size of n. That is, even when a failure occurs in a node or a link in the communication network G, it is possible to optimally reconstruct the communication network G while maintaining the characteristics of the original graph.

Here, the present invention is not limited to the above-described exemplary embodiments, and can be appropriately modified within a range not departing from the spirit of the invention.

For example, while a Ramanujan graph is applied to the communication network G in each of the above-described exemplary embodiments 1 and 2, a graph applied to a communication network G is not limited to a Ramanujan graph, and accordingly, a Cayley graph or a Petersen graph may be applied, for example, and any graph belonging to expander graphs may also be applied.

While the route information calculation unit 12 calculates shortest route information $M_i$ in each of the above-described exemplary embodiments 1 and 2, route information to be calculated is not limited to such shortest route information, and accordingly, the route information calculation unit 12 may calculate, for example, route information based on a band or a delay, or both of them. In such a case, the ranking information calculation unit 13 calculates ranking information Li in which ranking is made in descending order of distances in the route information $M_i$ calculated by the route information calculation unit 12.

While, in each of the above-described exemplary embodiments 1 and 2, the determination information calculation unit 14 calculates a combination which makes largest the average of node-to-node distances in the shortest route information $M_i$ over the entire communication network G after reconnection, on the basis of the ranking information Li calculated by the ranking information calculation unit 13, a combination to be calculated is not limited to that one, and accordingly, the determination information calculation unit 14 may calculate a combination which makes the average of node-to-node distances in the shortest route information $M_i$ equal to or larger than a predetermined threshold value.

Further, the present invention can be realized by causing a CPU to execute a computer program for performing the process shown in FIG. 5 or that in FIG. 9.

The program may be stored using various types of non-transitory computer readable media and may then be supplied to a computer. The non-transitory computer readable media include various types of tangible storage media. Examples of the non-transitory computer readable media include magnetic recording media (for example, a flexible disc, a magnetic tape and a hard disk drive), magneto-optic recording media (for example, a magneto-optic disk), a CD-ROM (Read Only Memory), a CD-R, a CD-R/W, semiconductor memories (for example, a mask ROM, a PROM (Programmable ROM) and an EPROM (Erasable PROM), a flash ROM and a RAM (Random Access Memory).

Besides, the program may also be supplied by various types of transitory computer readable media to a computer. Examples of the transitory computer readable media include electrical signals, optical signals and radio waves. Such transitory computer readable media may supply the program to a computer via a wired communication line such as an electric wire or an optical fiber, or a wireless communication line.

Part or the whole of the above-described exemplary embodiments can be also described as, but is not limited to, the following supplementary notes.

(Supplementary Note 1)

A communication network control system for, in the communication network with a plurality of nodes mutually connected via a plurality of links, eliminating any of the nodes having broken down or having a failure and performing reconnection within the communication network, wherein at least one of the plurality of nodes comprises:

a route information calculation means for calculating route information in the communication network when a failure occurs in an adjacent node;

a ranking information calculation means for calculating, with respect to destination candidate nodes to which the reconnection may be made, ranking information in which the destination candidate nodes are ranked in order of their distances in the route information calculated by the route information calculation means; and a determination information calculation means for calculating, on the basis of the ranking information calculated by the ranking information calculation means, a combination which causes distances in the route information to be large over the entire communication network after the reconnection, and determining the calculated combination as a reconnection destination node of the own node.

(Supplementary Note 2)

The communication network control system according to supplementary note 1, wherein the determination information calculation means calculates, on the basis of the ranking information calculated by the ranking information calculation means, a combination which makes the average of node-to-node distances in the route information over the entire communication network after the reconnection equal to or larger than a predetermined threshold value.

(Supplementary Note 3)

The communication network control system according to supplementary note 1 or 2, wherein the determination information calculation means calculates, on the basis of the ranking information calculated by the ranking information calculation means, a combination which makes largest the average of node-to-node distances in the route information over the entire communication network after the reconnection.

(Supplementary Note 4)

The communication network control system according to any one of supplementary notes 1 to 3, wherein each and every one of the plurality of nodes comprises the route information calculation means, the ranking information calculation means and the determination information calculation means, wherein the route information calculation means calculates shortest route information in which the own node is set as the starting point.

(Supplementary Note 5)

The communication network control system according to supplementary note 4, wherein, when there is an adjacent node in which a failure has occurred, the ranking information calculation means exchanges the calculated ranking information with all destination nodes to which reconnection may be made.

(Supplementary Note 6)

The communication network control system according to any one of supplementary notes 1 to 5, the communication network control system further comprising a determination information comparison means for fixing the reconnection destination node determined by the determination information calculation means of the own node as the reconnection destination, if having acquired determination information from the reconnection destination node and not having acquired determination information from the other nodes in the route information.

(Supplementary Note 7)

The communication network control system according to supplementary note 6, wherein, when an adjacent node has a failure and thereby becomes unable to communicate, the determination information comparison means re-sets a node of the next hop as the reconnection destination, and thereby performs route control.

(Supplementary Note 8)

The communication network control system according to any one of supplementary notes 1 to 7, the communication network control system further comprising a storage means for storing at least either of route information calculated by the route information calculation means and ranking information calculated by the ranking information calculation means.

(Supplementary Note 9)

The communication network control system according to any one of supplementary notes 1 to 8, wherein the nodes perform the reconnection in an autonomous and distributed manner.

(Supplementary Note 10)

The communication network control system according to any one of supplementary notes 1 to 3, wherein a representative node assigned in advance from among the plurality of nodes comprises the route information calculation means, the ranking information calculation means and the determination information calculation means, wherein the route information calculation means calculates, with respect to a set of nodes whose adjacent node has broken down, shortest route information in which each node in the node set is set as the starting point.

(Supplementary Note 11)

The communication network control system according to supplementary note 10, wherein, when the node has a failure and thereby becomes unable to communicate, the determination information calculation means performs re-route control on the basis of the determination information indicating a reconnection destination node.

(Supplementary Note 12)

The communication network control system according to any one of supplementary notes 1 to 11, wherein a Ramanujan graph is applied to the communication network.

(Supplementary Note 13)

A control method of a communication network control system for, in the communication network with a plurality of nodes mutually connected via a plurality of links, eliminating any of the nodes having broken down or having a failure and performing reconnection within the communication network, the control method comprising:

a step of calculating route information in the communication network when a failure occurs in an adjacent node;

a step of calculating, with respect to destination candidate nodes to which the reconnection may be made, ranking information in which the destination candidate nodes are ranked in order of their distances in the calculated route information; and a step of calculating, on the basis of the calculated ranking information, a combination which causes distances in the route information to be large over the entire communication network after the reconnection, and determining the calculated combination as a reconnection destination node of the own node.

(Supplementary Note 14)

A control program of a communication network control system for, in the communication network with a plurality of nodes mutually connected via a plurality of links, eliminating any of the nodes having broken down or having a failure and performing reconnection within the communication network, the control program causing a computer to execute:

a process of calculating route information in the communication network when a failure occurs in an adjacent node;

a process of calculating, with respect to destination candidate nodes to which the reconnection may be made, ranking information in which the destination candidate nodes are ranked in order of their distances in the calculated route information; and a process of calculating, on the basis of the calculated ranking information, a combination which causes distances in the route information to be large over the entire communication network after the reconnection, and determining the calculated combination as a reconnection destination node of the own node.

This application is based upon and claims the benefit of priority from Japanese Patent Application No. 2013-001308, filed on Jan. 8, 2013, the disclosure of which is incorporated herein in its entirety by reference.

REFERENCE SIGNS LIST 1 communication network control system
2 link
3 route information calculation means
4 ranking information calculation means
5 determination information calculation means
11 communication function unit
12 route information calculation unit
13 ranking information calculation unit
14 determination information calculation unit
15 determination information comparison unit
16 storage unit
G communication network
$N_i$ node
$N_O$ representative node
$N_x$ node having broken down or having failure
$N_j$, $N_k$, $N_l$ adjacent node of node having broken down or having failure

The invention claimed is:

1. A communication network control system for, in a communication network with a plurality of nodes mutually connected via a plurality of links, eliminating any of the nodes having broken down or having a failure and performing reconnection within the communication network, wherein at least one of the plurality of nodes comprises:

a route information calculation unit for calculating route information in the communication network when a failure occurs in an adjacent node;

a ranking information calculation unit for calculating, with respect to a set of destination candidate nodes to which the reconnection may be made, ranking information in which the destination candidate nodes are ranked in order of their node-to-node distances in the route information calculated by the route information calculation unit; and a determination information calculation unit for calculating, on the basis of the ranking information calculated by the ranking information calculation unit, a combination which causes node-to-node distances in the route information to be large over the entire communication network after the reconnection, and determining the calculated combination as a reconnection destination node of the own node, and wherein a Ramanujan graph is applied to the communication network.

2. The communication network control system according to claim 1, wherein the determination information calculation unit calculates, on the basis of the ranking information calculated by the ranking information calculation unit, a combination which makes the average of node-to-node distances in the route information over the entire communication network after the reconnection equal to or larger than a predetermined threshold value.

3. The communication network control system according to claim 1, wherein the determination information calculation unit calculates, on the basis of the ranking information calculated by the ranking information calculation unit, a combination which makes largest the average of node-to-node distances in the route information over the entire communication network after the reconnection.

4. The communication network control system according to claim 1, wherein each and every one of the plurality of nodes comprises the route information calculation unit, the ranking information calculation unit and the determination information calculation unit, wherein the route information calculation unit calculates shortest route information in which the own node is set as the starting point.

5. The communication network control system according to claim 4, wherein, when there is an adjacent node in which a breakdown or a failure has occurred, the ranking information calculation unit exchanges the calculated ranking information with all destination nodes to which reconnection may be made.

6. The communication network control system according to claim 1, the communication network control system further comprising a determination information comparison unit for fixing the reconnection destination node determined by the determination information calculation unit of the own node as the reconnection destination, if having acquired determination information from the reconnection destination node and not having acquired determination information from the other nodes in the route information.

7. The communication network control system according to claim 6, wherein, when an adjacent node has a breakdown or a failure and thereby becomes unable to communicate, the determination information comparison unit re-sets a node of the next hop as the reconnection destination, and thereby performs route control.

8. The communication network control system according to claim 1, the communication network control system further comprising a storage unit for storing at least either of route information calculated by the route information calculation unit and ranking information calculated by the ranking information calculation unit.

9. The communication network control system according to claim 1, wherein the nodes perform the reconnection in an autonomous and distributed manner.

10. The communication network control system according to claim 1, wherein a representative node assigned in advance from among the plurality of nodes comprises the route information calculation unit, the ranking information calculation unit and the determination information calculation unit, wherein the route information calculation unit calculates, with respect to a set of nodes whose adjacent node has broken down, shortest route information in which each node in the node set is set as the starting point.

11. The communication network control system according to claim 10, wherein, when the node has a breakdown or a failure and thereby becomes unable to communicate, the determination information calculation unit performs re-route control on the basis of the determination information indicating a reconnection destination node.

12. A control method of a communication network control system for, in a communication network with a plurality of nodes mutually connected via a plurality of links, eliminating any of the nodes having broken down or having a failure and performing reconnection within the communication network, the control method comprising:

calculating route information in the communication network when a failure occurs in an adjacent node;

calculating, with respect to destination candidate nodes to which the reconnection may be made, ranking information in which the destination candidate nodes are ranked in order of their distances in the calculated route information; and calculating, on the basis of the calculated ranking information, a combination which causes distances in the route information to be large over the entire communication network after the reconnection, and determining the calculated combination as a reconnection destination node of the own node, wherein a Ramanujan graph is applied to the communication network.

13. A non-transitory computer readable medium of control program of a communication network control system for, in a communication network with a plurality of nodes mutually connected via a plurality of links, eliminating any of the nodes having broken down or having a failure and performing reconnection within the communication network, the control program causing a computer to execute:

a process of calculating route information in the communication network when a failure occurs in an adjacent node;

a process of calculating, with respect to destination candidate nodes to which the reconnection may be made, ranking information in which the destination candidate nodes are ranked in order of their node-to-node distances in the calculated route information; and a process of calculating, on the basis of the calculated ranking information, a combination which causes node-to-node distances in the route information to be large over the entire communication network after the reconnection, and determining the calculated combination as a reconnection destination node of the own node, wherein a Ramanujan graph is applied to the communication network.

14. A communication network control system for, in a communication network with a plurality of nodes mutually connected via a plurality of links, eliminating any of the nodes having broken down or having a failure and performing reconnection within the communication network,
 wherein at least one of the plurality of nodes comprises:
  a route information calculation means for calculating route information in the communication network when a failure occurs in an adjacent node;
  a ranking information calculation means for calculating, with respect to destination candidate nodes to which the reconnection may be made, ranking information in which the destination candidate nodes are ranked in order of their distances in the route information calculated by the route information calculation means; and
  a determination information calculation means for calculating, on the basis of the ranking information calculated by the ranking information calculation means, a combination which causes distances in the route information to be large over the entire communication network after the reconnection, and determining the calculated combination as a reconnection destination node of the own node, and
 wherein a Ramanujan graph is applied to the communication network.

\* \* \* \* \*